United States Patent [19]

Frederick et al.

[11] Patent Number: 4,722,240

[45] Date of Patent: Feb. 2, 1988

[54] THRUST WASHER ASSEMBLY FOR SPEED GEAR SHAFT

[75] Inventors: Frank T. Frederick, Rochester; Richard A. Myers, Livonia; Richard G. Reed, Jr., Dearborn; Anthony J. Urbats, Livonia, all of Mich.

[73] Assignee: Chrysler Motors Corporation, Highland Park, Mich.

[21] Appl. No.: 6,854

[22] Filed: Jan. 27, 1987

[51] Int. Cl.⁴ .................. F16C 17/04; F16H 55/12
[52] U.S. Cl. .................................... 74/450; 384/420; 384/903
[58] Field of Search ............... 74/339, 359, 450, 451, 74/362, 373; 384/420, 424, 426, 427, 903; 403/344, 375

[56] References Cited

U.S. PATENT DOCUMENTS

| | | | |
|---|---|---|---|
| 3,159,047 | 12/1964 | Dable | 74/450 |
| 3,220,273 | 11/1965 | Christian | 74/450 X |
| 3,700,083 | 10/1972 | Ashikawa et al. | 192/53 F |
| 4,006,659 | 2/1977 | Wurzel et al. | 384/903 X |
| 4,138,168 | 2/1979 | Herlitzek | 384/903 X |
| 4,277,199 | 7/1981 | Livesay | 403/317 |
| 4,385,846 | 5/1983 | Knauss | 384/903 X |

*Primary Examiner*—Lawrence Staab
*Attorney, Agent, or Firm*—Edward P. Barthel

[57] ABSTRACT

An improved split thrust washer assembly for a vehicle transmission speed shaft. The assembly includes a pair of semi-circular washer segments held in a speed shaft circumferential groove by a C-type compression retaining ring. The ring biases each washer segment interior surface into contact with the groove base wall during maximum shaft speeds thereby neutralizing the centrifugal force tending to separate the segments from the groove. The segments have radially extending opposed end faces having a predetermined minimal clearance therebetween thereby insuring that the segments are maintained in contact with the groove. The thrust washer assembly allows a shallower groove to carry the design thrust loads so as to improve shaft fatigue life.

1 Claim, 4 Drawing Figures

THRUST WASHER ASSEMBLY FOR SPEED GEAR SHAFT

This invention relates to thrust washers in general, and more particularly to a gear thrust washer assembly wherein a retaining ring retains a split thrust washer between transmission speed gears.

BACKGROUND OF THE INVENTION

Split washer assemblies are used in such automotive applications as manual transmissions. In the automotive industry it has been the practice to use a continuous annular retaining ring to loosely retain split thrust washers in a speed shaft groove separating a pair of speed gears. As a result it has been the practice to form the circumferential groove in the speed shaft with sufficient depth to insure retention of the split washers. Such overdeep grooves, while providing a safety factor against loss of the split washers, have dictated the use of larger diameter speed shaft. Thus, to reduce the weight and size of speed shaft in their design stage, it would be desirable to provide an improved thrust washer assembly embodying a shallower shaft retaining groove while retaining sufficient contact area between the sides of the washers and the groove to absorb the design thrust loads. Such a thrust washer assembly would also allow speed shafts presently in production to be manufactured with shallower grooves thereby increasing their fatigue life.

The U.S. Pat. No. 4,277,199 issued July 7, 1981 to R. E. Livesay discloses a keeper assembly wherein a replaceable keeper segment in a track chain joint provides a shoulder to secure an arcuate keeper segment against axial displacement with respect to a track pin. The Livesay keeper segent has an outwardly opening side seat, and an external retaining ring of "C" configuration releasably connected to the side seat for holding the keeper segments positively in the groove.

SUMMARY OF THE INVENTION

It is an object of this invention to provide a thrust washer assembly including a split thrust washer having two halves or segments with an anti-rotational pin and surrounded by a C-shaped retaining ring to retain the thrust washer segments in a transmission speed gear shaft annular groove.

It is another object of this invention to provide an improved thrust washer assembly for a transmission speed shaft having an outer C-shaped compression retaining ring that extends peripherally around the two segments of a split thrust washer wherein the clamping force of the retaining ring biases the segments' interior semi-circular surfaces tightly to the bottom wall of a speed shaft circumferential groove. As a result, the design contact or thrust area between the sides of the split thrust washer segments and the groove sidewalls are maintained during maximum shaft speeds thereby obviating the centrifugal force trying to separate the interior segment surfaces from the shaft groove base wall.

It is another object of the present invention to provide a thrust washer assembly as set forth above wherein for a given diameter speed gear shaft the circumferential retaining groove may be designed shallower while maintaining a predetermined contact area between the sides of the washer segments and the groove side walls so as to absorb design thrust loads thereby reducing the shaft stresses and improving its fatigue life.

It is a further object of this invention to provide a thrust washer assembly as set forth above, wherein each of the washer segments has a peripheral concave-shaped furrow formed into its outer edge. When assembled the furrows capture the retaining ring therein such that the ring's clamping force enables it to be self-aligned on the medial transverse plane of symmetry of the split washer segments.

It is another feature of the invention to provide a thrust washer assembly with segments having radially extending opposed end faces positioned in parallel spaced manner. By providing a uniform predetermined minimal clearance between the end faces, the invention insures that the interior arcuate surfaces of the segments are positively maintained in contact with the groove base wall. Thus, the present invention maximizes the effective contact surface area between the thrust washer segments and the speed shaft groove. As a result for a given diameter speed shaft, retaining grooves are machined shallower thereby increasing the shaft cross sectional area at the groove to improve the shaft fatigue life.

BRIEF DESCRIPTION OF THE DRAWINGS

These and other objects and features will be apparent to those skilled in the transmission thrust bearing arts upon reading the following detailed description with reference to the accompanying drawings in which.

DETAILED DESCRIPTION OF THE DISCLOSURE

Figure 1:
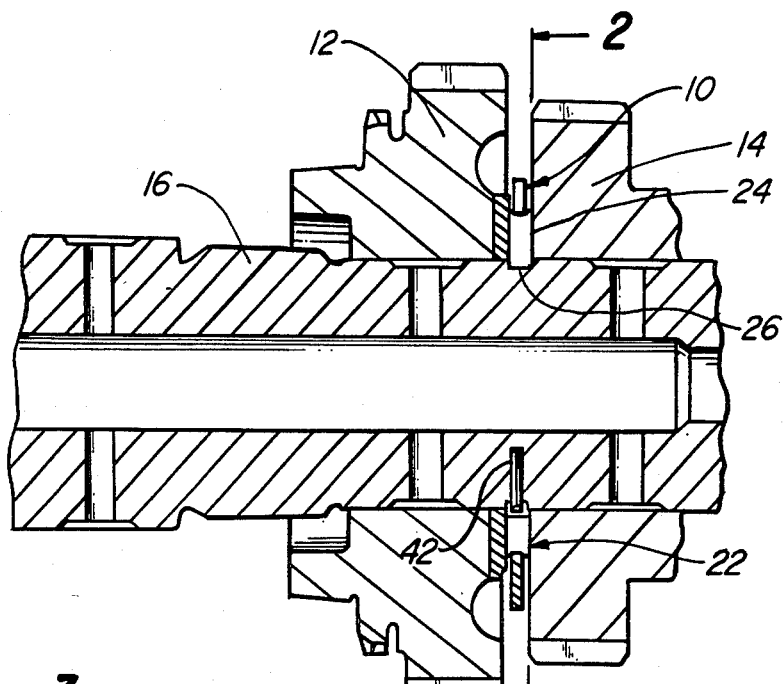
FIG. 1 is a cross-sectional view of a transmission speed gear shaft journally supporting a pair of speed gears with the improved thrust washer assembly located therebetween.

As shown in FIG. 1, a speed gear thrust washer assembly is shown generally at 10 intermediate left 12 and right 14 speed gears. The left speed gear 12 is journally supported on a transmission speed shaft 16 and is retained against leftward movement by suitable means, not shown, such as a synchronizer clutch assembly shown, for example, in U.S. Pat. No. 3,700,083. The right speed gear 14 is journally supported on the speed shaft 16 and is prevented from rightward movement by suitable means, not shown, such as a synchronizer clutch assembly.

Figure 3:
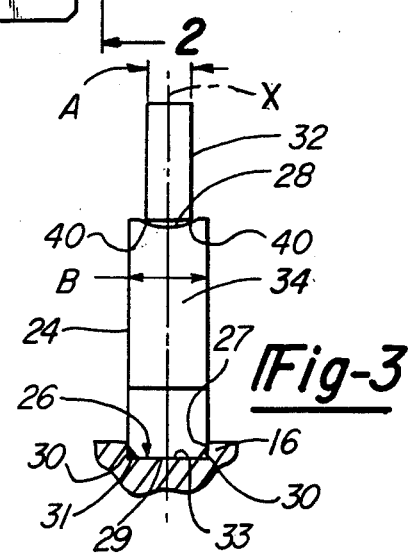
FIG. 3 is an enlarged fragmentary cross-sectional view taken on the line 3—3 of FIG. 2.

The thrust washer assembly 10 comprises a split washer 22 having its two identical 180 degree arcuate segments or halves 24 received in an annular right angled groove generally indicated at 26 having radially extending side walls 27 formed in the speed shaft 16. It will be noted in FIGS. 3 and 4 that each segment has its outer edge formed, such as by machining, with a concave arcuate shaped furrow 28 as viewed in longitudinal section. As seen in FIG. 3 each furrow 28 is symmetrically positioned about a transverse medial plane bisecting the split washer halves which plane includes the dashed centerline "X". Each washer segment 24 semicircular interior surface 29 has its edges beveled at 30 so as to clear radii 31 of their associated groove arcuate corners 31.

With the two split segments received in the shaft groove 26 a "C"-shaped compression or contracting type, retaining ring 32 resiliently holds the interior surfaces 29 of both the thrust washer segments 24 in tight contact with base wall 33 of the groove 26. It will be seen that in its installed FIG. 3 position. The inward compression force exerted by the retaining ring 32 results in the ring being captured or trapped in the two annular half ring furrows 28. Thus, the retaining ring 32 and segments 24 are substantially aligned in the transverse medial plane of the groove 26 defined by centerline "X". The retaining ring alignment with the segments is achieved because the ring 32 is designed to exert a predetermined radially inward clamping force on the arcuate furrows 28 of the segments 24.

Figure 2:
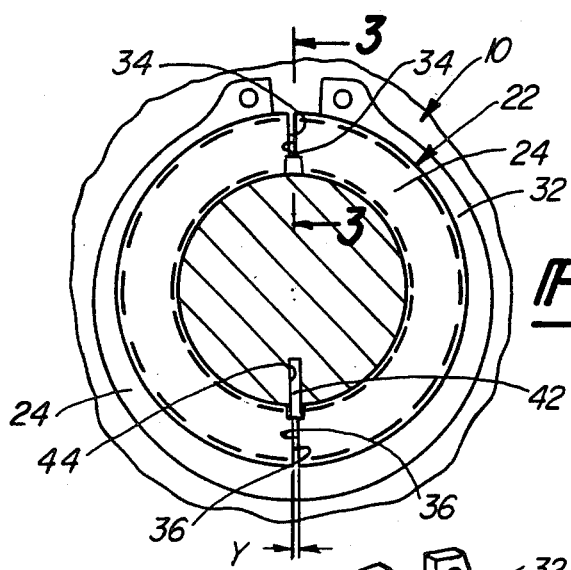
FIG. 2 is a cross-sectional view taken along the line 2—2 of FIG. 1.

With reference to FIG. 2, it will be seen that each segment 24 has its opposed 34 and lower 36 radially extending end faces positioned in parallel spaced manner. That is, both the upper end faces 34 and the lower end faces 36 of the segments are located with a uniform predetermined minimal clearance indicated by the dimension "Y". It is critical to applicants' thrust washer assembly that the interior surface 29 of each segment 24 be positively maintained in contact with the groove base wall 33. Thus, by providing the minimal end face clearances "Y" in combination with the predetermined inward clamping force of retaining ring 32 the assembly assures that the segments interior surfaces 29 are held in contact with the groove base wall 33 throughout all rotational design speeds of the shaft. The predetermined inward clamping force of the retaining ring is such as to counter the centrifugal force trying to separate the washer segments from the groove base wall 33 as maximum design speed of the shaft 16.

Figure 4:
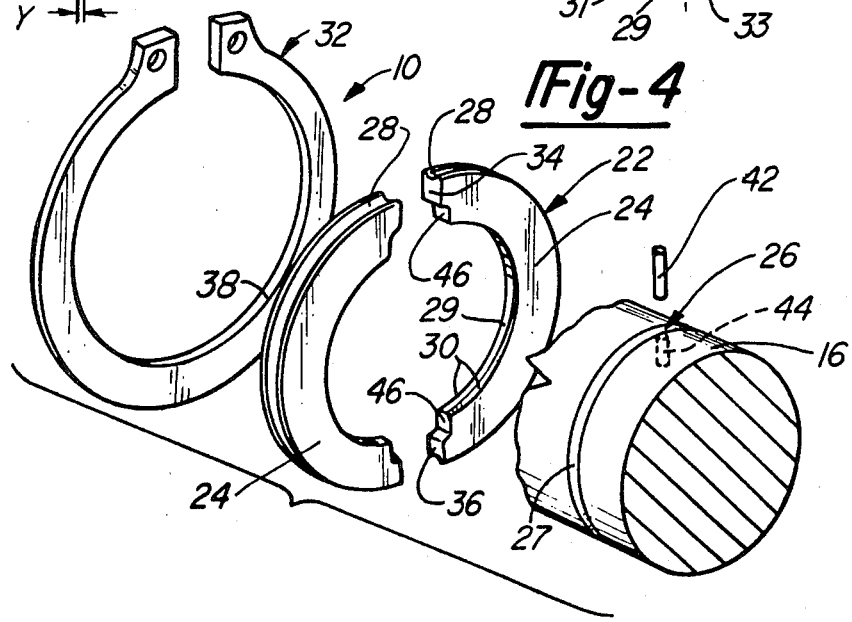
FIG. 4 is an exploded perspective view of the thrust washer assembly of the present invention.

As best seen in FIG. 4 an anti-rotational pin 42 is shown adapted to be received in shaft radial blind bore 44 formed in the base of shaft groove 26. As seen in FIG. 2 the pin 42 is of a predetermined length such that upon being received in the base 44 its outer ends protrude a determined distance from the shaft surface. Thrust thrust washer segments 24 each have a notch 46 formed at the inner end of each of its faces 34 and 36. Thus, the thrust washer halves 24 are located in the shaft groove 26 such that the outer end of the pin 42 is closely received in the hollow defined by a pair of opposed notches 46. The design of the anti-rotational pin is conventional with existing split washers using a continuous non-interrupted ring design which allows prior art segments to separate from the base wall of their shaft groove.

It will be noted in FIG. 3 that the segments 24 have a predetermined thickness "B" which is slightly less than the width of the shaft groove 26 providing a close tolerance fit therebetween. Further the retaining ring 32 has a predetermined thickness "A" which is of the order of one-half the dimension "B". The dimensional relationship provides that each corner 40 of the retaining ring 32 is positioned in line contact with an arcuate portion of the segment furrows 28. This enables the retaining ring 32 to seat itself in a self-centering manner coincident with the medial plane of groove centerline "X".

While a specific embodiment of the invention has been shown and described in detail to illustrate the application of the principles of the invention, it will be understood that the invention may be embodied otherwise without departing from such principles.

We claim:

1. In a vehicle manual transmission assembly including a speed gear shaft of a predetermined diameter, said speed shaft having a pair of speed gears rotatably supported thereon, an improved split thrust washer assembly adapted for location in an annular groove formed symmetrical about a transverse medial plane of symmetry in said speed shaft intermediate said speed gears, said groove having radially extending side walls and a concentric base wall with said side walls and base wall both of a predetermined extent, said split thrust washer segments each having an inner arcuate surface positioned in contacting relation with said groove base wall, each said segment having a pair of opposite end faces formed with a notched-out portions, said notched-out portions located at the radial inward end of each said end face, a single radial blind bore formed in said groove base wall receiving a stop pin therein, said stop pin extending radially outward a predetermined distance from the surface of said shaft such that it engages in an adjacent pair of said notched-out portions, said stop pin preventing relative rotational movement between said shaft and said segments, the improvement wherein:

each said one semi-circular thrust washer segment formed with a continuous furrow co-extensive with its outer periphery, each said furrow having an arcuate concave-shape in longitudinal cross section disposed about its associated segment's transverse plane of symmetry, each said segment having its transverse plane of symmetry positioned to include said shaft groove transverse medial plane;

said segments having their side surfaces juxtaposed said groove side walls and their end faces in opposed space relation defining a predetermined minimum clearance therebetween;

a single C-configured compression type retaining ring having a predetermined thickness about one-half the thickness of said segments, said retaining ring being captured in each said segment arcuate concave-shaped furrows such that both said retaining ring and said pair of segmentplanes are symmetrically self-aligned about said groove transverse medial plane by reason of the clamping force of said ring maintaining its interior pair of C-configured corners in symmetrical line-contact with said arcuate concave-shaped furrows;

said retaining ring interior pair of corners exerting a predetermined constant inward compressive force on said segments thereby obviating centrifugal forces developed from rotation of said shaft tending to separate each said segment interior surface from said groove base wall;

whereby as a result of each said segment interior surface being constantly biased into positive contact with said groove base wall a predetermined thrust contact area is continuously maintained between said groove side walls and each said segment's associated side surfaces during said shaft rotation, thereby allowing said groove side walls to be formed with a minimal predetermined radial extent so as to maximize the retained cross section of said shaft available at said groove wherein the fatigue life of said shaft is extended.

* * * * *